(12) United States Patent
Chang

(10) Patent No.: US 6,459,777 B1
(45) Date of Patent: *Oct. 1, 2002

(54) DIRECTIONALLY-MAPPED, KEYED ALPHA-NUMERIC DATA INPUT/OUTPUT SYSTEM

(75) Inventor: Liang Hsi Chang, Walnut, CA (US)

(73) Assignee: Keytouch Corporation, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/954,585

(22) Filed: Sep. 17, 2001

Related U.S. Application Data

(63) Continuation of application No. 09/224,435, filed on Dec. 31, 1998, now Pat. No. 6,320,942.

(51) Int. Cl.[7] .............................................. H04M 11/00
(52) U.S. Cl. .................................. 379/93.27; 379/93.17
(58) Field of Search ......................... 379/93.27, 93.18, 379/93.17, 93.26; 708/142, 143, 145; 341/22, 23

(56) References Cited

U.S. PATENT DOCUMENTS

| | | | |
|---|---|---|---|
| 3,967,273 A | 6/1976 | Knowlton | 379/93.27 |
| 5,249,220 A | 9/1993 | Moskowitz et al. | 379/93.26 |
| 5,339,358 A | 8/1994 | Danish et al. | 379/93.27 |
| 5,559,512 A | 9/1996 | Jasinski et al. | 708/142 |
| 5,790,103 A | 8/1998 | Willner | 345/168 |
| 6,043,761 A | 3/2000 | Burrell, IV | 379/93.18 |
| 6,320,942 B1 * | 11/2001 | Chang | 379/93.27 |

FOREIGN PATENT DOCUMENTS

| | | |
|---|---|---|
| GB | 2242047 A | 9/1991 |
| JP | 09011663 | 1/1997 |

OTHER PUBLICATIONS

Demande de Brevet European: 0 397164; Oct. 5, 1990.
Deutsches Patentamt DE 3446147 A1; Dec. 18, 1984.
PCT Search Report for Corresponding PCT Application No. PCT/US99/30129.

* cited by examiner

*Primary Examiner*—Stella Woo
(74) *Attorney, Agent, or Firm*—Stout, Uxa, Buyan & Mullins, LLP; Donald E. Stout

(57) ABSTRACT

A data entry and processing system providing for simple two stroke entry of numerous auxiliary alpha-numeric data in addition to the single stroke entry of numeric data, using conventional data entry keys. The key array includes a set of radial direction indicator keys that are used with the conventional keys to select and enter a given alpha-numeric data item. An LCD display, a pre-programed micro-processor and other electronic components are included to display the data entries, as well as to convert entered data signals to the necessary DTMF tones for telecommunication or ASCII codes for computer data entries. The system is simple for use by ordinary users, and all electronic components are standard, miniscule in size, small in number, low in power need and low in cost. It is particularly adaptable for miniaturized device application.

7 Claims, 4 Drawing Sheets

DIRECTIONALLY-MAPPED, KEYED ALPHA-NUMERIC DATA INPUT/OUTPUT SYSTEM

This application is a continuation of application Ser. No. 09/224,435, filed on Dec. 31, 1998, and now U.S. Pat. No. 6,320,942, which is herein expressly incorporated by reference.

BACKGROUND OF THE INVENTION

1. Field of the Invention

This invention relates to keypad and keyboard systems for data entry or device control and more particularly, to a directionally-mapped, keyed alpha-numeric data input/output system.

2. Background

On the present day conventional telephone keypad, there are ten numbered keys, an asterisk key and a pound sign key. The letters of the alphabet are listed in groups of three on eight of the number keys. Entering numerals is performed by simply depressing the indicated keys in turn. However, for entering any given letter (alpha) a special series of key strokes is required, and this method is not generally accepted or understood by the public. In telecommunication applications such as voice mail directory search or in a stock purchase using an electronic broker, a unique interpretation of alpha data codes is often necessary. As a result, errors in alpha data entry, using the conventional keypad, are a common and frustrating occurrence. The above prompts frequent requests for a simple, relatively error free method of alpha data and numeric data entry.

There have been many devices invented and available which purport to solve the problem posed by alpha-numeric data entry in a conventional key array, but none have been accepted by the public or manufacturers to date. This has been expressed as being primarily because of their difficulty in use and/or manufacturing.

Keyboards for computers and control panels typically have many keys, with some keys having two possible functions. The resulting keyboard size is acceptable for desktop computers, but not for space constrained computers such as laptops or various small, portable control panels. The current solution has been to make the keys very small in size and to require depressing several keys in correct sequence for a given command entry. For a user having large fingers, a small key surface and small separation between keys is unsatisfactory and invites error. Thus, key size and the number of keys needed, determine the size of the board or keypad.

For the manufacturers of remote controllers, calculators, games, mobile phones and similar electronic communication equipment, the space required for adequate data entry with conventional keys presents a continuing problem due to space limitations, and hinders desirable miniaturization of the device.

There exist many patents that address the alpha-numeric keypad problem. However, none disclose a system for keypad/keyboard data entry that provides for error-free data without complexity, or allows for practical miniaturization of a keypad/keyboard while permitting any desired number of distinct, single key data entries in a simple "hands on" format.

In many of the prior art patents such as those of Hashimoto, U.S. Pat. No. 4,918,721 and Wen, U.S. Pat. No. 4,825,464, the alpha-numeric keypad data entry problem was solved, but the solution proved to be too elaborate and cumbersome for general use. However, the use of keypads with multi-directional keys is taught by a number of patents, and this is an approach that promises a possibility of keyboard miniaturization. Among these patents is a disclosure by Lin et al in U.S. Pat. No. 5,528,235. Lin et al disclose a multi-status data entry key and a keyboard that is capable of a one-to-one correspondence between each key status and a pre-assigned signal or state. This is done by using a key having five facets and mounting it on a spring so that it can rock in four orthogonal directions and downwards. Thus each "key" acts as five keys; each facet direction push entering a different piece of data. No description or claim is given by Lin et al for the system required to convert and transmit this input data in usable form.

Unfortunately, the Lin et al invention and similar devices have not succeeded in the industrial market for telephonic communication or remote controllers and similar equipment. The reasons given by industry sources for failure to adopt these invention devices, include the likelihood of user finger tactile errors in data entry using multi-faceted keys such as described by Lin et al as well as an expensive complexity in manufacturing the device, particularly the keys.

In view of the foregoing, it is clear that there remains a need for a simple, relatively error-free alpha-numeric data entry system for telecommunication equipment, as well as for space-constrained computers, miniaturized controllers and the like.

SUMMARY OF THE INVENTION

The invention is a directionally-mapped, alpha-numeric data entry system comprising a key array, a micro-processor, a DTMF generator, an LCD driver and a display. The key array includes at least one set of "n" radial direction indicator keys and a numerical key group. Inscribed on the surface surrounding each numerical key in "n" radial directions are alpha notations, symbols or commands. Pressing any radial direction key and then a numerical key will enter the alpha notation or other symbol that is located around the numerical key and corresponds to the pressed radial direction. Thus, if eight radial directional keys are used, a total of eight different alpha entries plus one numeric can be entered for every key in the numerical key group without tactile problems or errors. A specially programed micro-processor accepts the keyed input signals and provides digital signals to a DTMF generator for conversion to DTMF codes for telecommunication. The micro-processor also provides ASCII codes for computer input and signals to an LCD driver that drives the display. A complete system including the key array, uses only a few components which are readily available, is small in size, low cost and uses little power. It therefore would be readily adaptable and suitable for telecommunication equipment or other common data entry/communication devices.

Accordingly, it is a prime object of this invention to provide a system that enhances the functionality of a conventional numeric keypad while retaining simplicity in usage.

Another object is to provide an alpha-numeric data entry system that is economic to produce and practical to install.

Yet another object of this invention is to provide a data entry system that can be very small in size and lends itself to device miniaturization.

A prime advantage of this invention over prior art is that all the invention components are standard, available and low cost.

Further objects and advantages of the invention will be apparent from studying the following portion of the specification, the claims and the attached drawings.

DESCRIPTION OF THE PREFERRED EMBODIMENT

Figure 1:
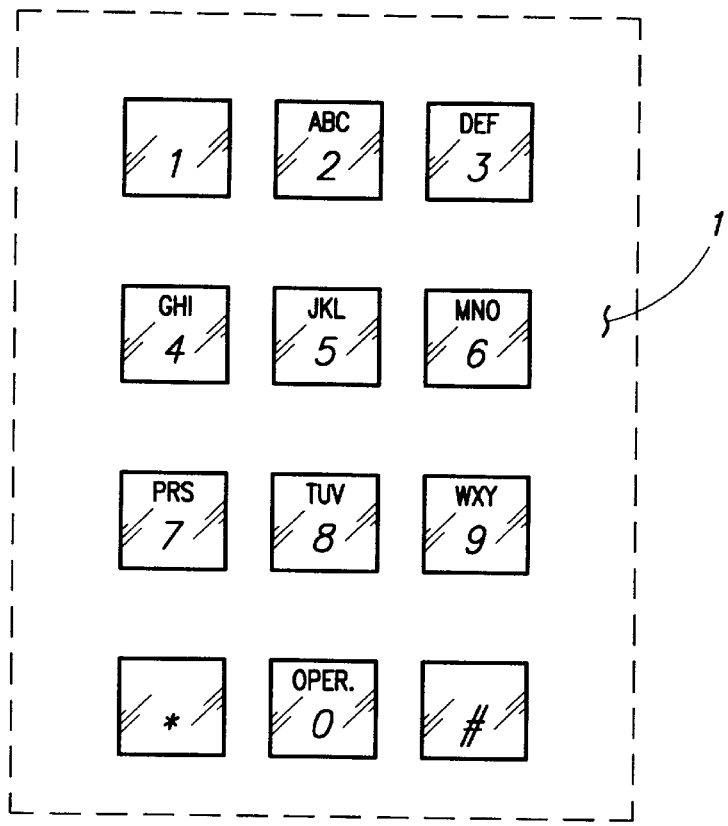
FIG. 1 is an illustration of a conventional prior art keypad as is used for telephones.
Figure 2:
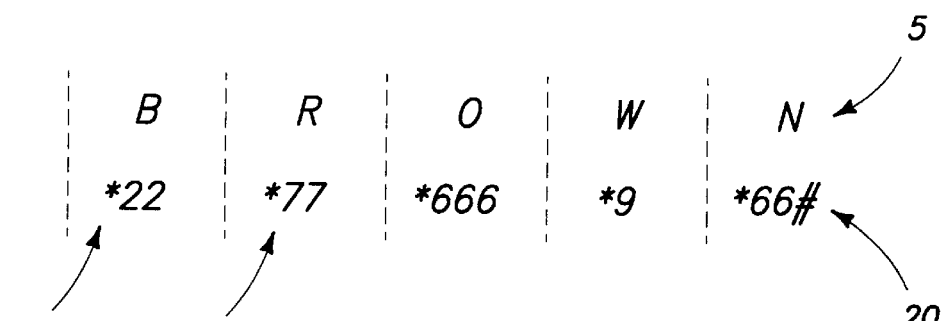
FIG. 2 shows the word "BROWN" and the keypad strokes needed to enter each letter when using a conventional prior art keypad.

Referring particularly to the drawings, there is shown in FIG. 1 an illustration of a conventional keypad 1 such as is used on telephones. Twenty-four letters of the alphabet, excluding "Q" and "Z" are shown in groupings of three on eight of the numerical keys. Refer now to FIG. 2 which shows a word "BROWN" to be keyed in. In order to do this, using the conventional keypad 1, a number of key strokes have to be entered for each letter, plus an extra key stroke when the word is completed. The key strokes corresponding to each letter of "BROWN" are shown under each letter. Thus to enter "B" 10, the "*" key is pressed once to indicate alpha and the "2" key is pressed twice because "B" is the second letter on numerical key "2". Similarly, to enter "R" 15, the "*" key must be pressed followed by pressing the "7" key twice. At the end of the word, after the key strokes "*66" have been entered for the letter "N" 5, the "#" key 20 must be pressed to indicate the end of the alpha entry. There are sixteen separate key strokes that must be entered in proper sequence in order to enter the word "BROWN" on a conventional keypad, and there could be as many as twenty-one key strokes for some five letter words.

It is then, not surprising that this formidable and error-prone way of entering alpha data into telephones is not at all favored by the public.

It is with hope of providing a public and industry favored way of alpha-numeric data entry, that the following preferred embodiment of a directionally-mapped alpha-numeric data entry system is offered.

Figure 3:
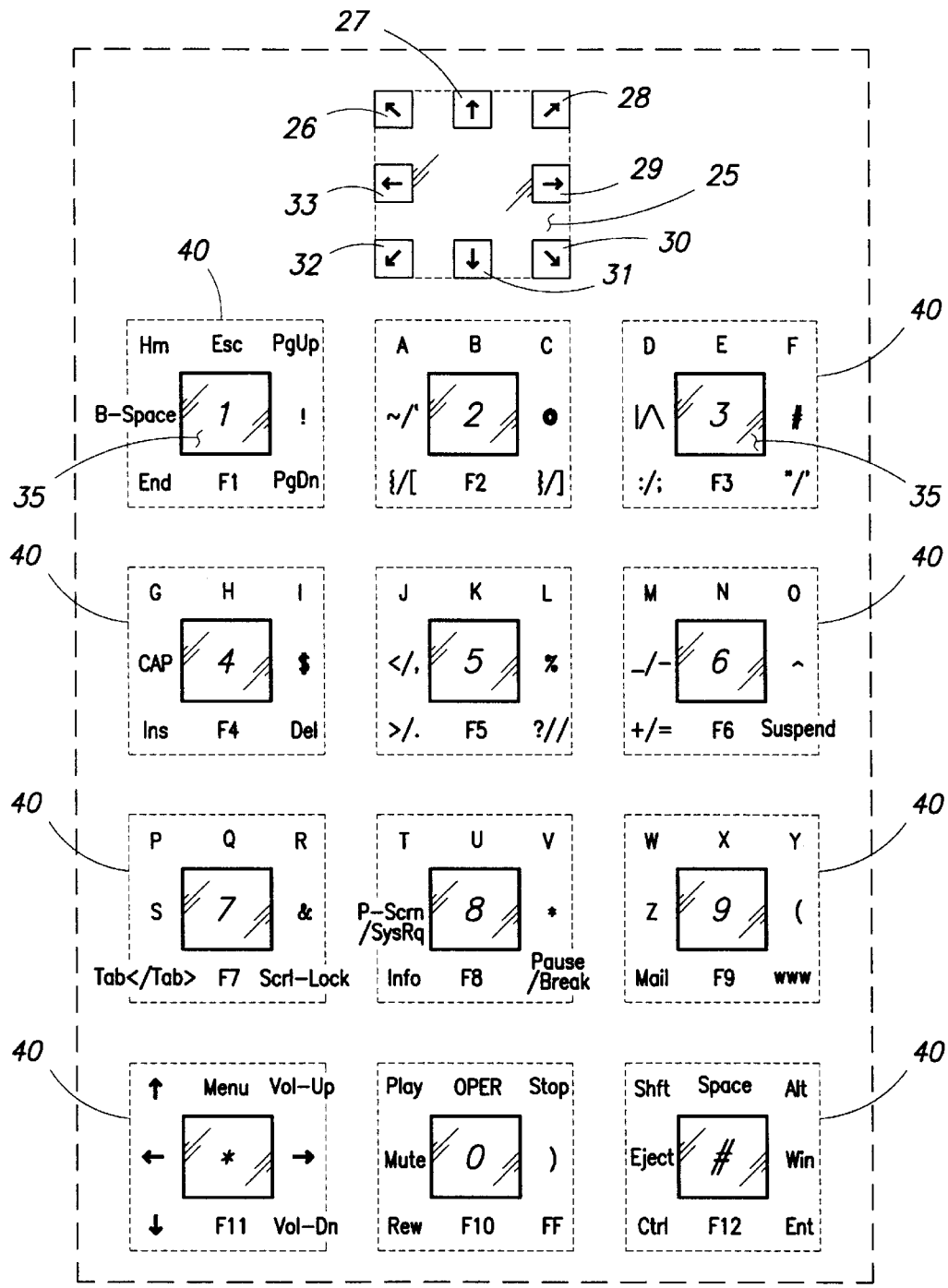
FIG. 3 shows an example of a multi-symbol data entry key array according to the present invention.
Figure 4:
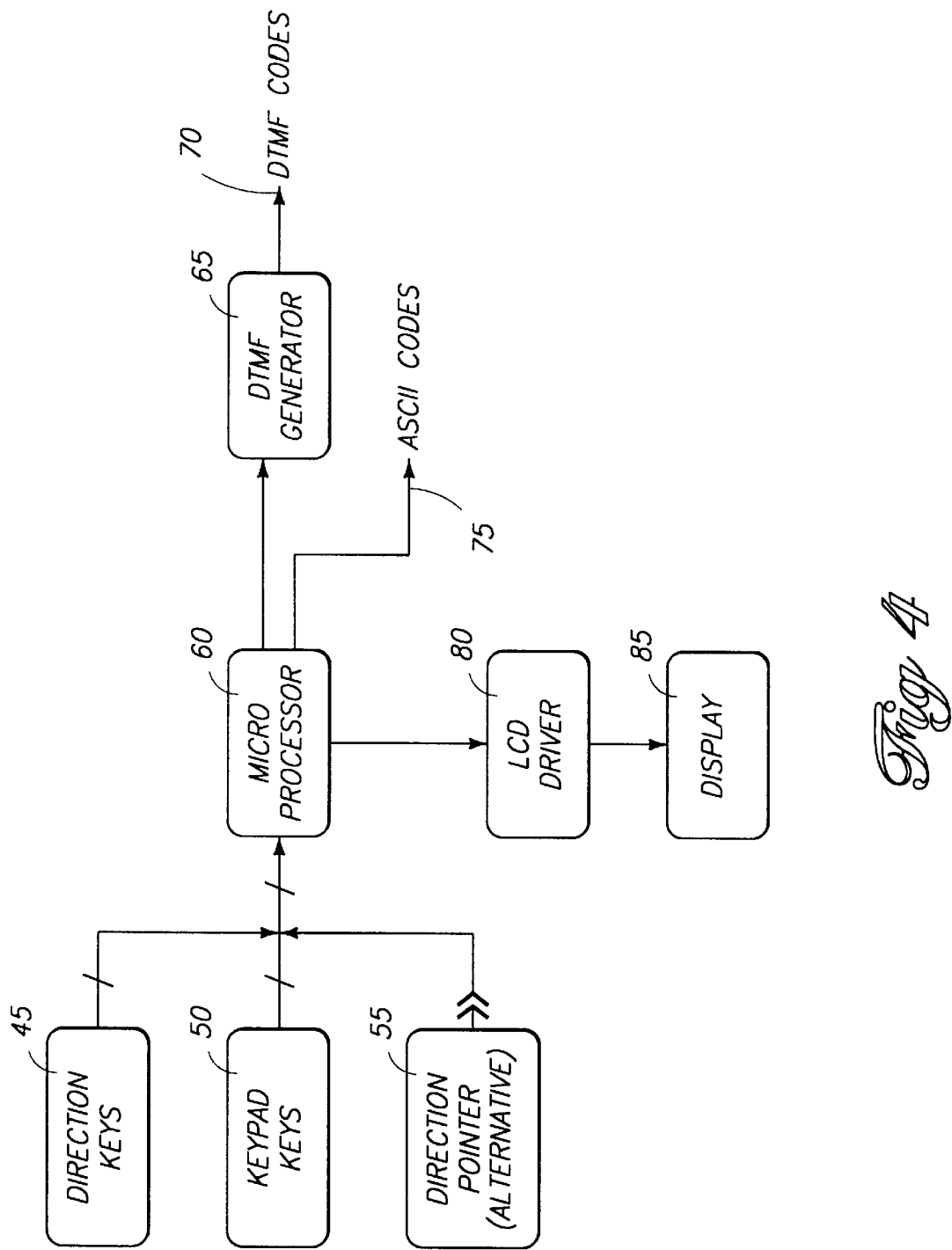
FIG. 4 is a simplified block diagram of the alpha-numeric data entry system according to the present invention.

Referring now to FIGS. 3 and 4, there is shown in FIG. 3 an example layout of a multi-symbol entry key array according to the present invention, and in FIG. 4, a simplified block diagram of the invention system. The system comprises: a pre-programed micro-processor 60, a set of radial direction indicator (RDI) keys 45 and keypad or array keys 50 that provide data input signals to the micro-processor 60, a DTMF generator 65 which converts signals from the micro-processor into DTMF codes 70 for telephonic use, an LCD (liquid crystal display) driver 80 supplied by signals from the micro-processor 60 and a display 85 driven by the LCD driver 80.

The micro-processor 60 is programed to process all entered alpha-numeric data and to convert it to BCD code for transmission to a DTMF generator circuit, or to output ASCII codes 75 for computer use. In addition, provision-is made for user selection of a verification mode of data entry whereby the user views the data entry on the display before agreeing to enter the data for processing.

Provision is also made for an alternative direction pointer 55 such as the well known computer mouse, to be connected and used instead of direction keys 45 on a keypad or array.

The micro-processor 60, DTMF generator 65 and LCD driver 80 are minute in size and use little input power. It is the key array that takes the most space.

The key array shown in FIG. 3 is an example of an array for combined controller/computer input. Radial direction indicator (RDI) keys are shown at the top of the array, on a large area membrane circuit surface 25. It is noted, for clarity, that the term "RDI keys", in the preferred embodiment, does not actually describe separate "keys", but actually "portions" of the single membrane circuit surface 25. The eight directions are indicated by inscribed arrows 26, 27, 28, 29, 30, 31, 32, and 33, which are touched when required. The numerical keys 35, of which twelve are shown, are, in this case, the same as conventional numerical keys.

Figure 5:
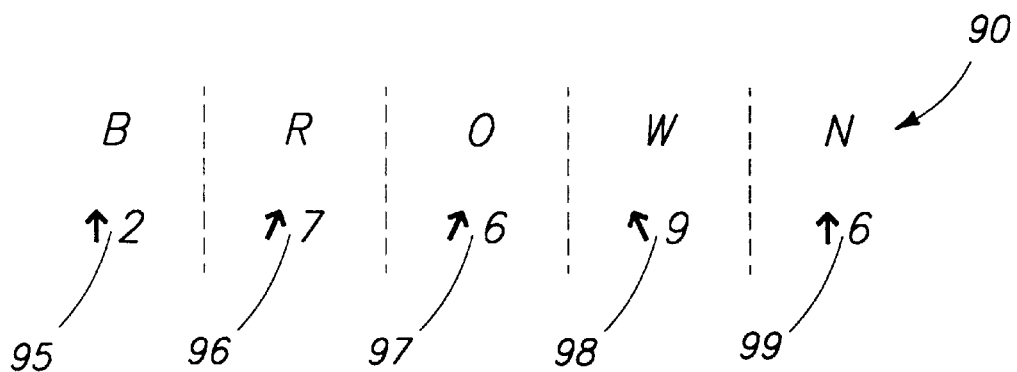
FIG. 5 shows the word "BROWN" and the keypad strokes needed to enter each letter when using a data entry key array according to the present invention.

Inscribed on areas 40 around each numerical key are eight different notations, each indicating a letter, number, a command or other symbol for entry. To enter any one data item other than the conventional keypad numerals, it is only necessary to first touch the RDI arrow on the membrane 25, corresponding to the position of the inscribed data 40 around a numeral key 35. Thus, to enter a "B" one would touch the UP arrow 27 and then press the "2" key. FIG. 5 illustrates the key strokes needed to enter the word "BROWN". The key strokes 95, 96, 97, 98 and 99 are combinations of an RDI directional key stroke and a single numeric key stroke for a total of ten. The sequence of the 2-stroke process can be reversed if desired. This is called operating in a "reverse" or "confirm" mode. An advantage of operating in the "confirm" mode is to help an end-user to see the relative locations of possible key or function selections in the display after the first conventional key stroke. If followed by an RDI key, the associated mapping alpha/function will be confirmed and entered. If followed by a conventional key instead, the normal numerical data input will be accepted as regular numerical inputs.

For numerical data entries, the conventional single stroke process on the conventional keys remains unchanged.

In the array illustrated in FIG. 3, there are eight RDI direction keys and eight possible data entries inscribed around each of the twelve numerical keys. Therefore, in addition to the twelve numerical key single stroke entries, there are available 8×12=96 additional data double stroke data entries, for a total of 108.

It should be noted that there could be any convenient number of keys in an array and any number of RDI direction keys.

The maximum number of data items inscribed around a given key depends primarily on the space provided around the key for printing the data items intelligibly. In the example array shown in FIG.3, there are eight data items. However, if two rings of data items were used, forming an inner and outer ring around a given key, there could be sixteen data items per key, plus the one single key item. An extra set of RDI direction keys for the outer data ring could be used for this configuration, or possibly a special "outer ring" key.

Figure 6:
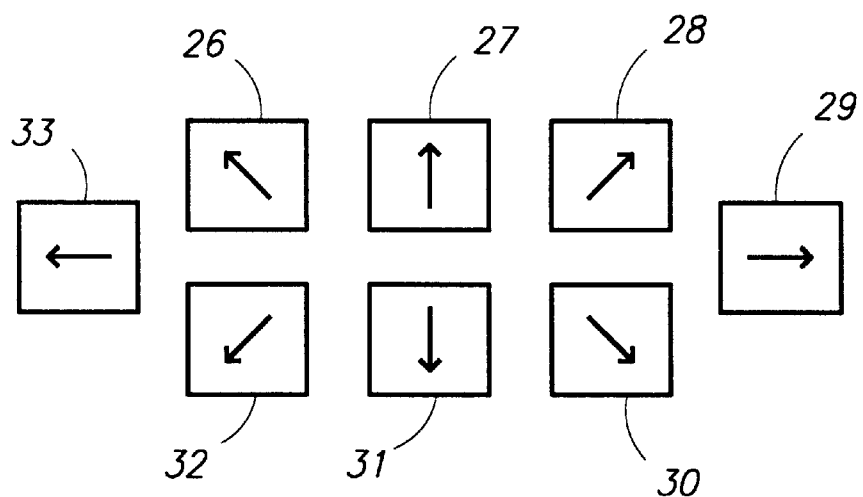
FIG. 6 illustrates one of several alternative configurations for the directional keys that are located on a data entry key array according to the present invention.

FIG. 6 shows one possible arrangement of RDI direction keys as an alternative to that shown on FIG. 3. In this arrangement, the RDI direction keys are individually located and are not on a single membrane. Any arrangement of RDI direction keys is permissible, and this permits a location flexibility helpful in designing data entry key arrays for miniaturized control panels or keypads.

The selection of the number of keys, data entry type and number of entries, depends entirely on device application. For a standard telephone entry pad, the number of keys could remain as twelve numerical, with twenty-six alpha data items (A to Z) added. A practical number of RDI direction keys for this array is three, so that there would be three letters or less around ten numerical keys. This ensures a simple error-free alpha-numeric input to a telephone. For dialing, number entry is done conventionally. For alpha-numeric or just alpha entry, only an unambiguous two stroke entry is required. It is not necessary to remember different codes or to figure out the number of strokes required, or whether an asterisk or pound sign input is required. This simple approach would be a great boon to telephone users and would probably be welcomed by the telecommunications industry as being long overdue.

A major characteristic of the invention system is that the ratio of input data to keys is increased to at least 9:1. As a result, the application of the invention system to space constrained communication devices, is facilitated by an ability to design for a much smaller number of keys than otherwise would be required. In particular, it is believed that the present invention system could be used to great advantage for space constrained devices such as remote controllers, electronic organizers, calculators, computers, games and various control panels.

There is also great flexibility in the type of keys that could be used. These keys could be any currently available types such as conductive, rubber or membrane circuitry.

Finally, it should be noted that the system electronic components are small in size, few in number, very low in power consumption and inexpensive in cost. For large manufacturing quantities, the entire system is very low cost.

From the foregoing description, it is believed that the preferred embodiment achieves the objects of the present invention. Various modifications and changes made be made in the system described above which are apparent to those skilled in the art. These alternatives and modifications are considered to be within the scope of the appended claims and are embraced thereby.

Having described the invention, what is claimed is:

1. An alpha-numeric data input/output system for telephonic devices, comprising:

a key array, said key array comprising a plurality of data entry keys, each having an indicated primary data item thereon and a plurality of auxiliary data items disposed radially outwardly of said primary data item in predetermined directions;

said key array further comprising a plurality of radial direction indicating (RDI) keys corresponding in number to said plurality of auxiliary data items, and also corresponding in relative position thereto, said plurality of RDI keys each having indicia to provide a visual cue to an operator as to the appropriate RDI key to select in order to ensure selection of a correspondingly located auxiliary data item on a particular data entry key; and a microprocessor connected to said key array, said microprocessor being programmed to interpret which of said selected data items is being input when a particular data entry key is depressed, and to convert such interpreted data items into appropriate code for use by a data output device.

2. The alpha-numeric data input/output system as recited in claim 1, wherein said plurality of RDI keys are disposed on a single membrane circuit surface.

3. The alpha-numeric data input/output system as recited in claim 1, wherein said data output device comprises a dual tone modulated frequency (DTMF) generator circuit, and wherein said microprocessor is programmed to convert input data items to BCD code for transmission thereto.

4. The alpha-numeric data input/output system as recited in claim 3, and further comprising an LCD driver circuit, wherein said microprocessor also generates alpha-numeric signals corresponding to data entries, for transmission to said LCD driver circuit; and a liquid crystal display for displaying alpha-numeric data entries as they are made.

5. The alpha-numeric data input/output system as recited in claim 1, wherein said indicia comprises an arrow.

6. The alpha-numeric data input/output system as recited in claim 1, wherein said microprocessor is programmed to operate in a first mode, comprising a sequence of first actuating one of said RDI keys, and then actuating a selected data entry key.

7. The alpha-numeric data input/output system as recited in claim 1, wherein said microprocessor is programmed to operate in a second, reverse, mode, comprising a sequence of first actuating a selected data entry key, permitting a visual display of all auxiliary data items disposed on said selected data entry key on a display, for user review and selection before any selected auxiliary data item is entered and processed, and then actuating a selected RDI key.

* * * * *